Dec. 26, 1922.    1,439,849
E. D. STODDER.
WAVE POWER MOTOR.
FILED OCT. 30, 1918.
4 SHEETS-SHEET 2
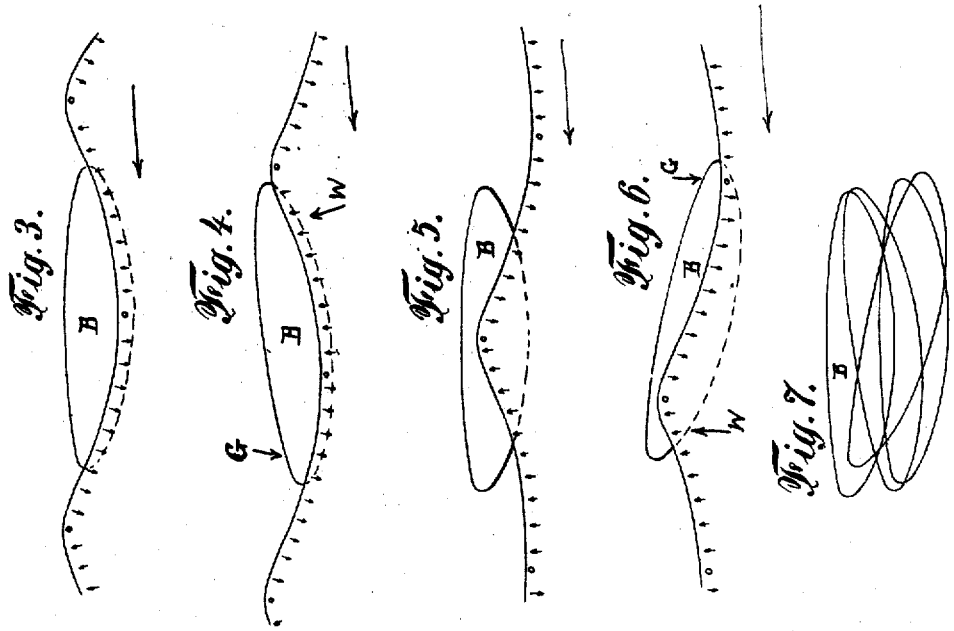
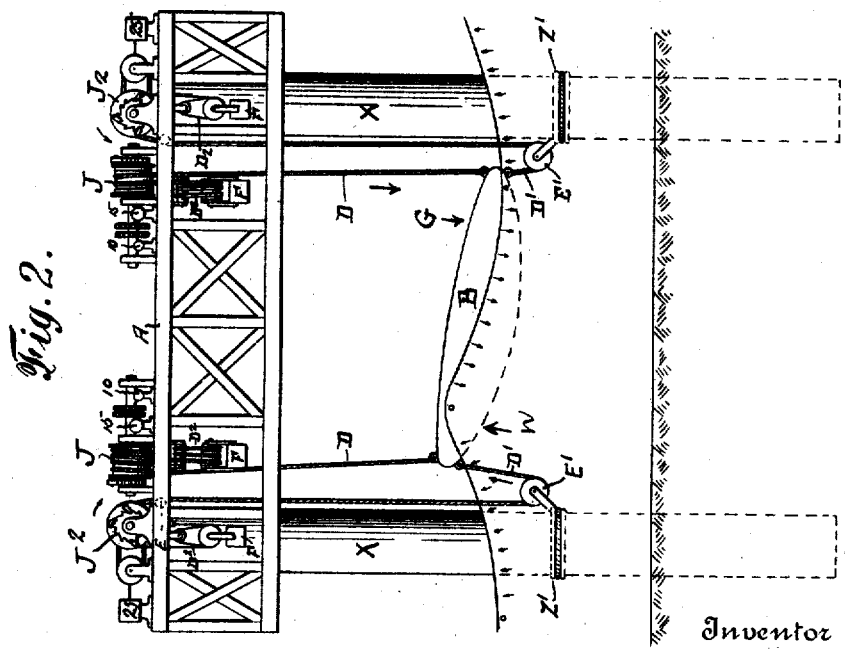
Inventor
EDWARD D. STODDER
By his Attorneys Dec. 26, 1922.

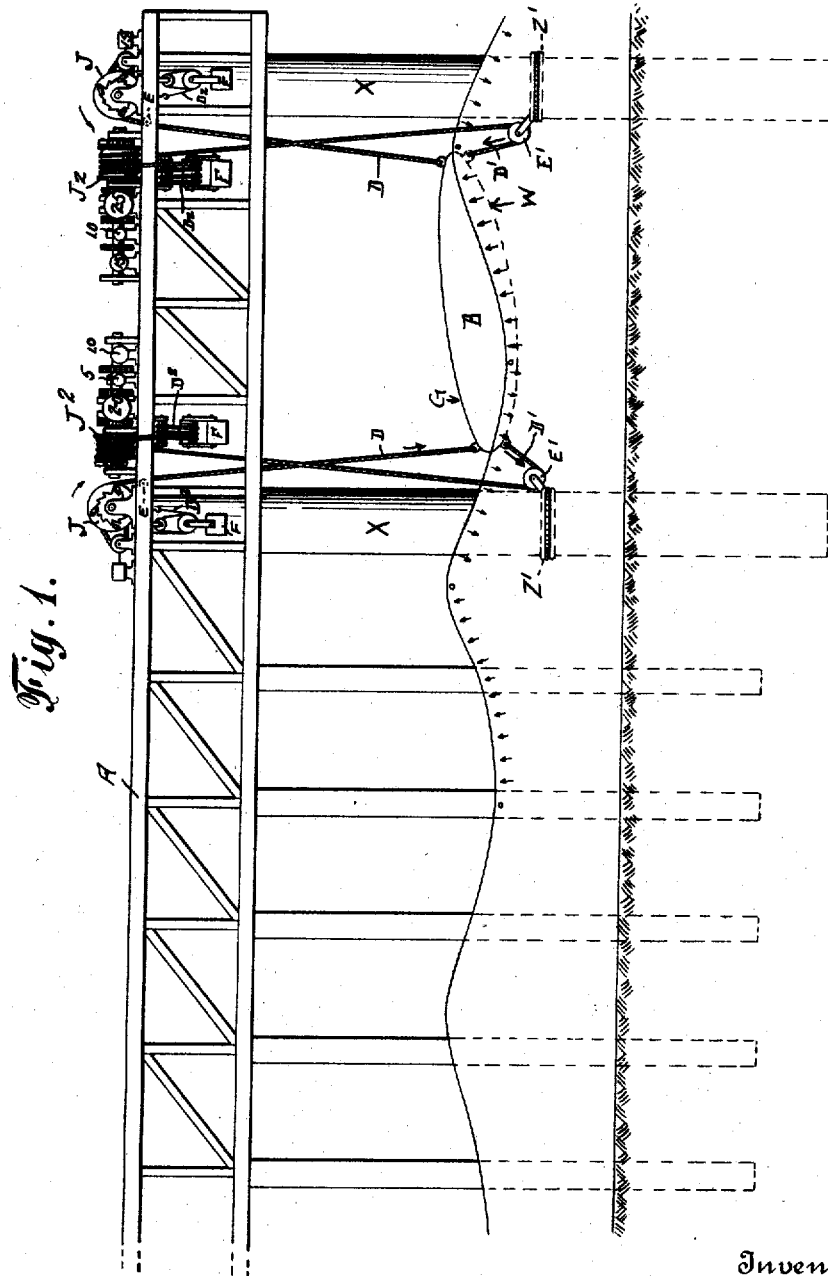

E. D. STODDER.
WAVE POWER MOTOR.
FILED OCT. 30, 1918.

Inventor
EDWARD D. STODDER
By his Attorneys

Dec. 26, 1922.
E. D. STODDER.
WAVE POWER MOTOR.
FILED OCT. 30, 1918.
1,439,849
4 SHEETS-SHEET 4
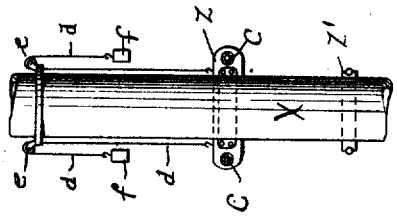
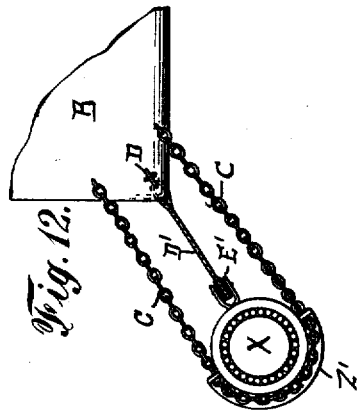
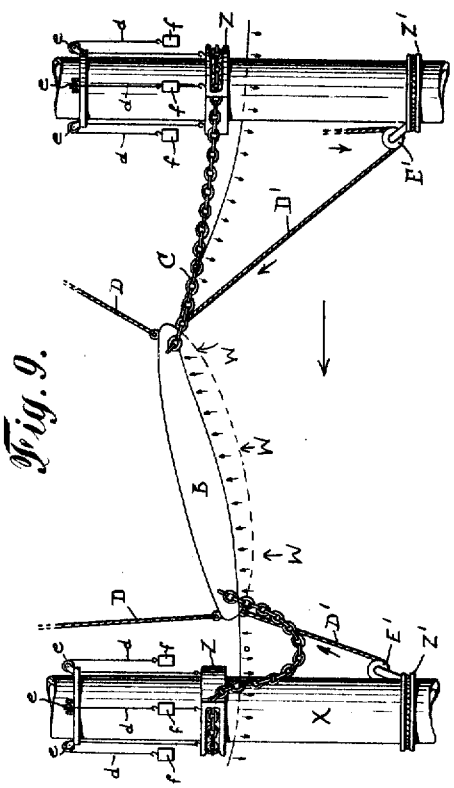
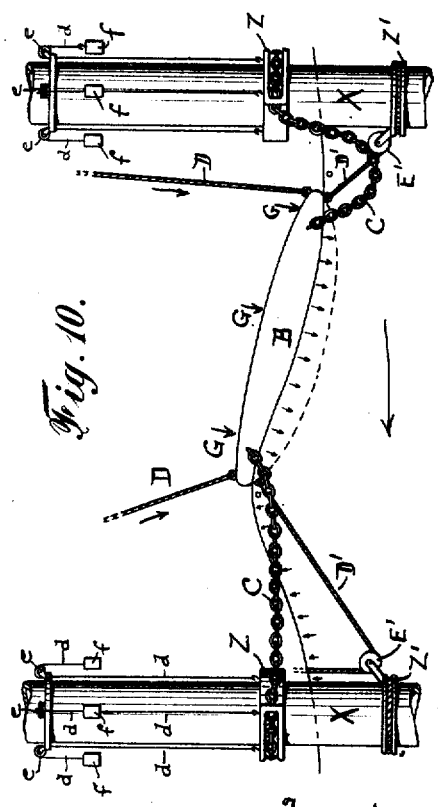
Inventor
EDWARD D. STODDER
By his Attorneys Patented Dec. 26, 1922.

1,439,849

UNITED STATES PATENT OFFICE.

EDWARD D. STODDER, OF NEW ROCHELLE, NEW YORK.

WAVE-POWER MOTOR.

Application filed October 30, 1918. Serial No. 260,388.

*To all whom it may concern:*

Be it known that I, EDWARD D. STODDER, a citizen of the United States of America, residing at New Rochelle, in the county of Westchester and State of New York, have invented certain new and useful Improvements in Wave-Power Motors, of which the following is a specification.

My invention relates to improvements in motors or mechanism for utilizing the irregular motion and power of water-waves, and consists of the parts and details of construction as will be hereinafter fully set forth in the drawings and pointed out in the specification.

The object of my invention is to provide a machine, apparatus, or train of mechanism adapted to be acted on by the force of gravation and the irregular motion and force of water-waves, and to convert the power of said forces acting on said motors into a regular mechanical motion for industrial purposes; the said machine, apparatus, train of mechanism, or various elements forming parts of same receiving, converting and transmitting motion and power relatively to the irregular motion and power applied to or acting on them by the two forces of nature they are designed to utilize.

My invention consists in providing and properly arranging piers or columns, buoys or floats, ropes or cables, guiding-sheaves or rollers, counterweights, shafts, wheels, and other well known forms of mechanism so as to receive, convert and transmit motion and power relatively to the two forces of nature acting on each and all of them, separately or collectively; the ever varying motions of the float, caused by the actions of the forces of gravitation and the waves on it, being transmitted to and converted into rotary motion of wheels and shafts by means of a number of ropes or cables suitably connected to the float, properly guided by sheaves or rollers and kept taut by counterweights, and suitably connecting with wheels and shafts so as to impart an irregular rotary motion to them; the said irregular rotary motion of wheels and shafts to be thereafter converted into a regular form of power by any of the well known means for doing so.

I am aware that other inventions make use of piers, floats, cables, counterweights, guiding sheaves, and other similar mechanism to utilize wave-power; but my invention is very different from any of which I have any knowledge, inasmuch as the others are not adapted to have motion relatively to the motion of the waves and also simultaneously receive and transmit power relatively to the varying force of the waves and the force of gravitation simultaneously acting on them; whereas in this one the float is adapted and allowed to be moved in any and every direction, never strike against anything, and not only receives and transmits power simultaneously in different directions, but also relatively to the force of the waves and the force of gravitation acting on it at any and all times, either simultaneously in different directions with different amounts of power, or in similar directions at different times with similar or different amounts of power; and converts, combines and stores the different amounts of power transmitted in any and all directions at any and all times, into a single, concentrated, and uniform supply of potential energy the total amount of which would be relatively equivalent to the sum of all the different amounts transmitted at any and all times, as will more fully appear from the drawings and accompanying detailed description.

The reason the words "simultaneously" and "relatively" and the phrase "relatively as applied" are so often used herein is: because they greatly help to define the very important difference between my wave motor and all others of which I have any knowledge; a difference in which is involved one of the great fundamental principles that makes much of the difference between what is practicable and impracticable in wave power motors, as the successful utilization of wave power depends upon practically utilizing simultaneously and relatively as applied forces of varying amounts simultaneously acting sometimes in similar directions and sometimes in different directions, and also forces in different amounts in similar directions at different times.

Referring to the drawings forming part of this application, in which similar letters of reference are used to denote corresponding parts throughout the entire specification and several views.

Fig. 1 is a side elevation of the float and part of pier and mechanism, and shows how there could and would be simultaneous action and utilization of wave force and gravity;

Fig. 2 is an end elevation at right angles to Fig. 1, and in conjunction with Figs. 1 and 8 showing automatic adaptability of my wave motor to waves coming in any direction, either straight in and square across the entire front of the float, from either side, or from any intermediate angle; also showing simultaneous action of wave force and gravity in opposite directions to that shown in Fig. 1;

Figure 8:
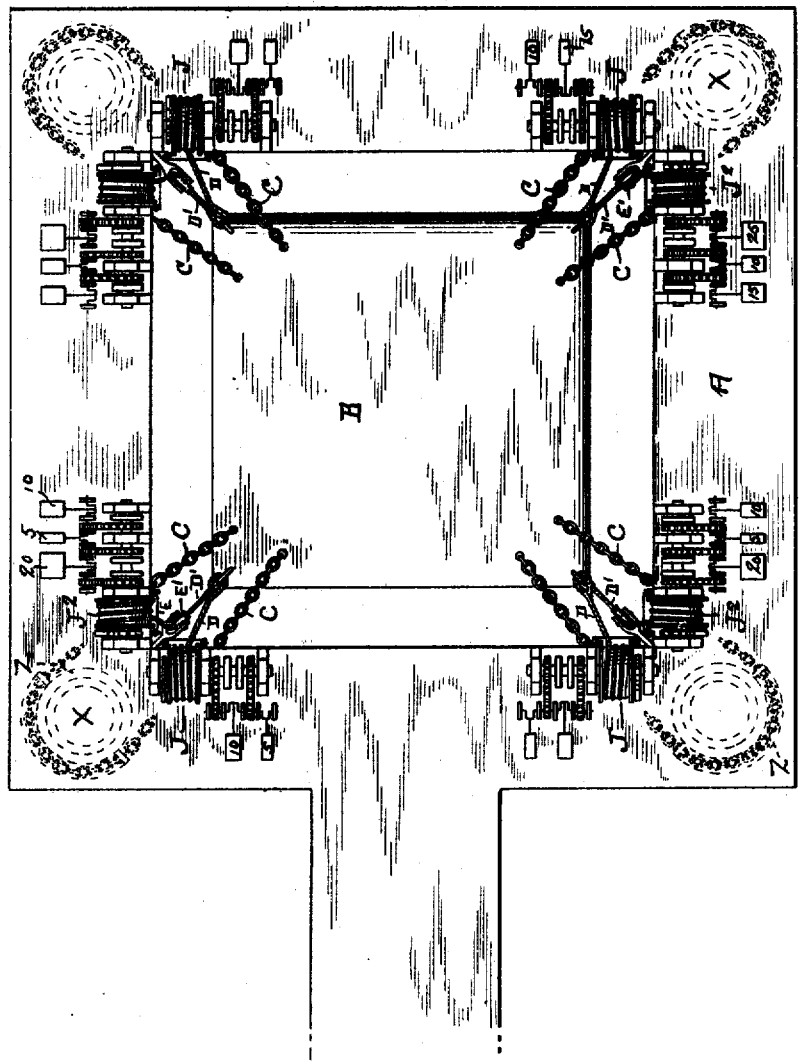

Figs. 3, 4, 5, and 6 show some of the different positions a float will have or be in, and the varying applications of force it will be subjected to during the passage of a single wave;

Fig. 7 is a composite sketch showing how the different positions of the float shown separately or apart in Figs. 3, 4, 5, and 6 occur in nearly the same place;

Fig. 8 is a plan view showing relative positions of columns, float and mechanism, how they are adapted for waves coming in any direction, and also helping to illustrate how power may be obtained simultaneously in different directions and varying amounts, and, also, in different amounts in similar directions at different times;

Fig. 9, is an elevation of an automatically adjusting anchorage mechanism, showing the float and anchorage mechanism in high tide position and wave force the dominant force acting, simultaneously upward under the entire float;

Fig. 10, is a view similar to Fig. 9, but showing the float and anchorage mechanism in low tide position and the force of gravity dominating over the entire float.

Fig. 11 is a vertical section and Fig. 12 a horizontal section through details of anchorage mechanism.

In order to demonstrate clearly the fundamental principles involved in the practical utilization of wave power, and particularly to designate wherein my wave-motor differs from all others, it is deemed necessary first to point out how the forces of nature act on and affect the float—the prime element on which they directly act—then how the float receives and transmits the constantly varying energy of these forces to or through the necessary intermediate or connecting elements or train of mechanism to the desired result—a constantly available, equalized supply of power that would be relatively equivalent to the sum of the varying amounts of power transmitted to the float at different times and in different directions.

With this object in view I will consider a large, flat, or nearly flat, float as on the ocean in deep water and subjected to what is known as waves of oscillation.

In waves of oscillation, as the wave form advances, the water from hollow to crest is rising on the advancing side and falling from crest to hollow on the opposite side of the wave, as indicated by the arrows in Figs. 1, 2, 3, 4, 5, 6, 9, and 10; the large horizontal arrows indicating the assumed direction of advance of the wave form and the small arrows along the underside of the wave profiles pointing in the direction to indicate rising or falling motion of the water. The "o's" at hollow indicate the limits of down motions and the "o's" at crests the limits of up motions of the water at the surface.

Starting with the float at its lowest level position in a hollow between two waves, as shown in Fig. 3, it is obvious that as the wave advances one side of the float will be raised as in Fig. 4; as the wave advances further the entire float will be raised to the highest level position possible by the wave, as in Fig. 5; and as the wave continues to advance the float will tip as in Fig. 6, and then again reach its lowest possible level position as in Fig. 3.

The passage of each wave would cause it to go through a series of similar motions; the extent of said motions and the amount of power obtainable from them varying with the size of the waves.

While gravity would, of course, be constantly exerting its force in a downward direction over the entire float, that of the waves would be intermittently exerted in an upward direction, though not altogether vertical, or always on the entire float. The variations in the motions of floats on the ocean show that at certain times and places the force of the waves is the dominating force, or, greater than that of gravity; while at others, gravity is the dominating force acting on the float; and, also, though at times either force alone may be dominating on the entire float as wave force, upwardly, in Fig. 9, and gravity downwardly in Fig. 10; at other times one force may be dominating in one direction on one part of the float, while the other force is dominating in the opposite direction on another part of the float, as shown in Figs. 1, 2, 4, and 6. The arrows, marked "G" for gravity and "W" for wave force, indicate wherein each force is the dominant one. In Figs. 1, 2, 4, and 6 the wave profile is drawn relatively small, and in Figs. 9 and 10 relatively large to the size of the float to clearly show the distinct difference in action and effect due to the difference in the relative sizes of the waves and float and position of float on waves at different times.

A float on ocean waves does not rise and fall directly up and down in the same vertical plane because the incline of the wave that causes it to tip also causes it to sway horizontally back and forth approximately as shown in Fig. 7, which is a composite sketch of the motions of the float shown separately in Figs. 3, 4, 5, and 6.

It is not claimed that the illustrations and descriptions of the motions of the float are perfect and complete, but are rather to give an idea of the four extreme variations of position the float may be assumed to have, but have for an instant only, during the passage of a single wave; as, besides these, there would be many intermediate variations—far too many to attempt to describe.

From these illustrations and from observation of vessels or floats on the ocean, it is obvious that besides the force exerted by the vertical motions of the entire float as a rising or falling body, great force would also be simultaneously exerted in different directions by the opposite sides, ends or corners of a large float acting as a gigantic lever, due to the rocking motions imparted to it by the actions of the waves and gravity.

These rocking motions of the float would cause a pull "up" on one side and a simultaneous pull "down" on the opposite side, then a reversal of these simultaneous up and down motions to the opposite sides of the float from which they first occurred on. And as the power of the up motion would often, if not always, be greater than that of the down motion, to utilize the power of these rocking motions relatively as applied we must have mechanism adapted to obtain the power from them simultaneously in different directions and in different amounts.

Besides these rocking motions just referred to, when the waves are more than twice the length of the float, as in Figs. 9 and 10, part of the time the entire float would be rising and simultaneously pulling up on all four of the cables designed to take power from the upward motions of the float as shown in Fig. 9; and part of the time the entire float would be falling and simultaneously pulling down on all four of the cables designed to take power from the downward motions of the float as shown in Fig. 10. And as the lifting force applied by the waves to a large, light flat float would, most of the time, be much greater than that required to lift its weight, it is evident that the amount of power obtainable from the upward and downward motions of the float would be unequal. Therefore, to obtain power relatively to the forces acting on the float we must have mechanism adapted to obtain power simultaneously from the upward motions of any and all parts of the float relatively to the force applied to and available from said upward motions; and also mechanism adapted to obtain power simultaneously from the downward motions of any and all parts of the float relatively to the force applied to and available from said downward motions.

Furthermore, as the size and speed of the waves vary greatly from time to time, and therefore the power obtainable from them would also vary greatly, to obtain the power relatively in proportion to the variation of the size and speed of the waves, we must have mechanism adapted to operate with both variable speed and extent of motion and also adapted to obtain power in different amounts at different times.

All the variations in speed and amount of wave motion that would occur at different times, as well as all variations due to the tides, are automatically compensated for, and all variations in amounts of power can be obtained relatively as applied and converted into a constantly available, uniform, equalized supply of power, the total amount of which would be relatively equivalent to the sum of the various amounts transmitted to and from the float at different times, by means of an arrangement and adjustment of cables, sheaves, counterweights, converting mechanism, a system of adjustable pumps or their equivalents, and means for storing power, described as follows.

In carrying out my invention I would construct a pier A, the head or outer end of which would be made so as to form an open space somewhat as shown in plan view, Fig. 8. This open space may be square, oblong, or of any desired shape or size.

Besides the piles or supports ordinarily used in pier construction, I would construct four extra large, strong, heavy piers or columns X, one at or near each corner of the open space, their lower ends being sunk into and firmly secured in the bottom below the water. These columns may be iron cylinders filled with concrete, or of any other suitable construction to make them practically immovable and indestructible.

These columns would be connected by bridges, girders, or any suitable type of construction. On these columns, or the bridges connecting them may be placed some of the mechanism for receiving and converting the motion and power of the waves and transmitting it to a power house on shore or other place for utilization.

Within the open space between these columns I would place a float B. This float may be of any suitable shape and construction, but should be of such a size as to leave a space of several feet between it and the columns X, and arranged in such a manner that it can be moved in any direction by the action of the waves and rise and fall of the tide; its horizontal motions being somewhat limited by anchorage cables C or any suitable anchorage means, so as to prevent its striking the columns.

Each float and its connecting cables and mechanism would constitute a wave-motor unit, of which units there may be as many as desired in a wave power plant.

To provide for any and all variations in wave motion and the rise and fall of the tide, and so as to obtain the power of all the various irregular motions of the float, I attach one end of eight power-transmitting cables to the float, two at or near each corner. These cables operate, receive, and transmit the power of the motions of the float as follows:

One end of each of four of these power cables, marked D, is fastened to the float B, one at or near each corner, and passes from there up to and is wrapped around its power-converting wheel or drum J. These cables may have a counterweight F suspended from their other ends to keep them taut and cause tension on the wheel; or, to prevent any possibility of their slipping on the wheel, the upper end of each cable may be fastened to the wheel and another, a smaller and lighter cable, $D^2$, be wrapped around the wheel in the opposite direction, have one end connected to its counterweight F and the other end fastened to the wheel J. Then when any corner of the float falls, the power cable D, attached to that corner, will be pulled down, turn its power-converting wheel J, unwind from it, wind the cable $D^2$ around the wheel in the opposite direction and raise the counterweight F. As any corner of the float rises, its counterweight F will fall, pull down on its cable $D^2$, which will unwind from and turn its wheel J in the opposite direction from that produced by the falling motions of the float, and wind its cable D around it.

Suitable guiding sheaves or rollers, as E, may be secured at any place deemed necessary to properly guide said cables and prevent their rubbing against parts of the structure.

As the weight of the float would be much greater than the counterweights, more power could be obtained from the downward motions of the float than from those of the counterweights, therefore each of the cables D, the wheels J, and the converting mechanism of which they form a part, are so arranged that they receive and transmit power only when the corner of the float to which they are connected falls or draws away from its power-converting wheel J. The arrows adjoining the cables D and wheels J indicate the direction in which they would be moving when transmitting power.

One end of each of four cables marked $D^1$ are fastened to the float, one at or near each corner, then passed down under the sheaves or pulleys $E^1$, thence up to power-converting wheels $J^2$. Each of these power cables $D^1$ would be connected to its power wheel $J^2$, similar to the cables D to wheels J, and each would also have counterweights F and cables $D^2$ arranged to operate in conjunction with them like those used in conjunction with the cables D and wheels J.

As the sheaves $E^1$, under which the cables $D^1$ first pass, are to be secured to the columns where they will always be below the corners of the float, as these cables and the mechanism connected to them would offer some resistance to the rising motions of the float, therefore by this arrangement each of the cables $D^1$ receives and transmits its power only as the corner of the float to which it is attached rises or draws away from its sheave $E^1$, and as its corner of the float rises or falls always moves in the opposite direction to the cables D fastened to the same corner of the float, but transmit their power only when moving in the direction indicated by the arrows adjoining them.

From the preceding description it is evident that the irregular motions of the float would impart irregular reciprocating motions to each of the eight power-transmitting cables, which, in turn, would impart irregular, alternating, two-way rotary motions to the wheels J and $J^2$ and that these motions would vary as to speed, distance and power.

For each float there would be eight converters or sets of converting mechanism, one for each power-transmitting cable. Each converter or set of converting mechanism would consist of one of the large wheels J or $J^2$, a shaft on which the said wheel would be free to rotate in either direction, a ratchet or clutch or equivalent mechanism to convert the power-transmitting motion of the wheel into a one-way rotary motion of said shaft, one or more pumps or compressors or eqivalents with clutches or equivalent means for connecting or disconnecting any or all of them to or from said shaft.

One or more reservoirs, receivers or equivalents (not shown) would be provided for storing or equalizing whatever form of potential energy the wave power would be converted into.

In Fig. 8 I have shown eight of these converters with twenty pumps as a means of obtaining the power as unequally transmitted to the float by the waves at different times and converting it into an equalized supply of potential energy the total amount of which would be relatively equivalent to the sum of all the variable amounts transmitted at all times.

Each of the four converters marked J are assumed to take power and operate pumps from the downward motions of the corner of the float nearest to it; and each of the four converters marked J² are assumed to take power and operate pumps from the upward motions of the corner of the float nearest to it.

The pumps are assumed to be equipped with clutches or equivalents (not shown), so that any combination of one or more pumps may be operated by each converter. Gears, belting or chain-drive may be used, if desired, to increase speed and number of strokes.

The pumps may have capacity ratios as indicated by the figures marked on them, or may have any other capacity ratio.

Now we will assume that the power transmitted by the downward motions of each of the cables D on the inner or shoreward side of the float would be equal from each cable and also that it is the least transmitted by any two of the eight cables; while the power transmitted from each of the two cables D on the outer or seaward side of the float would be equal from each but greater than from the two cables D on the inner or opposite side. That the amount of power transmitted by each of the cables D¹ by the upward motions of the inner or shoreward side of the float to be equal from each but more than from either pair of cables D transmitting power from the downward motions of the float; and that the amount of power transmitted by each of the cables D¹ from the upward motions of the outer side of the float to be equal from each but more than from any of the other three pairs of cables.

We will also assume, for example, that for each converter J at each of the inner corners we have one pump of five cubic feet capacity per stroke and one of ten cubic feet per stroke. And for each converter J at each of the outer corners we have one pump of ten cubic feet per stroke and one of fifteen cubic feet per stroke. We will also assume that for each converter J² at each corner we will have three pumps of different sizes. For the two inner corners, say one pump of five cubic feet capacity per stroke, one of ten feet and one of twenty feet. And for each of the two outer corners one pump of ten, one of fifteen and one of twenty-five cubic feet per stroke.

With such an arrangement of pumps of different sizes it would be possible to make adjustment for any reasonable amount of variation that would occur; both that due to the difference in the amount of power available from the up and down motion of any wave, and also that due to the difference in different sized waves. By using the smallest pumps at the two inner converters J, we would obtain 5 cubic feet of water per stroke from each. By using the largest pumps 10 cubic feet from each. And, by using both together, 15 cubic feet per stroke. Likewise, from each of the outer converters J, either 10, 15 or 25 cubic feet. From each of the inner converters J², singly or in combination, 5, 10, 15, 20, 25, 30 or 35 cubic feet. And, from each of the outer converters J², 10, 15, 25, 35, 40 or 50 cubic feet per stroke.

With all eight converters adjusted to work at their lowest capacity, we would have a total of 60 cubic feet; whereas, with all working at full capacity, 250 cubic feet, with a possibility of adjustment for practically any amount between these two.

Obviously, the capacity of the pumps forms no element of my invention, and those set forth are merely illustrative of the invention, by which, with pumps, compressors or equivalents of proper sizes available, adjustments could be made to provide for practically all variations; both those due to the difference in the amount of power available at different times on account of the changes in the size of the waves, and those due to the difference in the amount of power available simultaneously in different directions from practically all waves at all times.

There might possibly be a series of waves of some certain size that, acting on a certain size float, would cause an equal amount of power to be transmitted by both the up and down motions of each corner. If so, it would make no difference, for by my method the power can be handled in either equal or unequal amounts. And, if it were possible for the power from the up and down motions to be equal in amount at any time, it would be absolutely impossible for it to be equal at all times.

As a means of receiving energy applied in such variable amounts and irregular manner, as would be the case from wave motion, and of converting it into a constant uniform supply of energy from which electricity may be satisfactorily generated, we will assume to use pumps, water and a reservoir, as a reservoir permits of water being pumped into it in an irregular manner such as I have described (as simultaneously by any number of different sized pumps) and all the water pumped therein becomes a single, equalized unit or body of potential energy, so that when discharged through pipes and turbines with regulating valves or governors on them, it would produce a constant uniform motion that, applied to a dynamo, would produce a uniform current of electricity as long as a sufficient head of water was maintained in the reservoir and regardless of how irregular the water may have been pumped into it. And the total amount of water pumped into the reservoir would be relatively equivalent in potential energy to the sum of the forces simultaneously acting in different directions with varying amounts of energy and the various amounts of energy acting at different times in similar directions. Ten horse power pumped in by two small waves one day would be just the same as ten horsepower pumped in by one large wave the day before or any other day. And it would make no difference whether either or both were pumped by the up or down motion of the float. Together they would make twenty horsepower, every horsepower of which would be exactly equal and alike and would, therefore, produce exactly the same effect.

As a means to prevent the counterweights F hanging down in or near the water, their cables $D^2$ may be passed around a number of sheaves, part of them on idlers to which the counterweights F would be attached, so that the counterweights and idlers, in traveling a short distance, will take up the slack caused by the long travel the power cables would have on account of the extreme variations due to tides, extra large waves, and when hoisting the float up above the water. This arrangement is shown in Figs. 1 and 2.

It is obvious that, if the float were allowed to strike against the columns X, either or both would be damaged or destroyed; and that, as shown in Figs. 1 and 2, the power cables D and $D^1$ would not prevent the float from striking the columns. It is also obvious that with anchorage cables rigidly secured at any definite place on the columns and only a relatively small amount of space left between the columns and float, the extent of the up and down motions of the float would be very limited and not sufficient for the extreme variations in tides and very heavy seas. Therefore, so as to use the largest float possible within a given space, prevent its striking the columns and at the same time allow it to rise and fall freely to any necessary extent, I adopt the type of anchorage or stop mechanism shown in Figs. 8, 9, 10, 11 and 12, and described as follows:

At or near each corner of the float B I attach one end of an anchorage cable C, then pass it around a large iron or steel collar Z encircling the column X nearest to it, and then secure the other end at or near the same corner of the float. These collars may be made with an upper and lower flange extending about half way around and connected at the terminus of each so as to form an eye on each side of the collar; the cable C passing through the eyes and resting on or between the flanges as shown in Figs. 9, 10, 11 and 12. To these collars I attach a number of small cables $d$, pass them up over sheaves or pulleys and secured above at any suitable place on the columns X or the bridges connecting them, and to the other end of these cables attach counterweights $f$ of sufficient weight to about counterbalance the weight of collar Z and cable C resting on it.

There would be four stationary collars $Z^1$, or equivalents, of any suitable construction, one for each column X, formed as part of each column or constructed separately and securely fastened to the columns, to be used as a means to securely hold the sheaves $E^1$ at any desired distance below low water line and also limit downward motions of collars Z. Iron bars or eye-bolts secured in the columns could be used as equivalents.

Ball bearings or anti-friction rollers may be placed between the collars Z and columns X to make the collars turn around and move up and down easily.

The four anchor cables C would be of suitable length to allow the float to move in any direction between the columns but not strike against them; each cable having sufficient slack to permit the float to go nearly to the column on the opposite side or corner but not strike it, as shown in Figs. 9 and 10.

As there would be one of these anchorage cables and collars at each corner, it is obvious that as each and every corner of the float rises and falls to any great extent with the action of the tide and waves, the collars Z nearest them will rise and fall with it, and thus, with a limited space between the float and columns, by having all parts properly proportioned, the float may rise and fall, rock or tip, or sway horizontally to any necessary extent but not strike against the columns. The arrangement of the flanges and eyes on the collars would prevent the cables slipping off of them and also make the collars draw more evenly up and down than if the cables were connected directly and only to one side of the collars.

From the foregoing description it will be manifest that, as there is always motion and power on the surface of the ocean, and said motion and power are very irregular, by constructing a wave-power motor as shown and described, the movable parts or elements thereof would have motion relatively to the motion of the waves and would also receive, convert and transmit power approximately in proportion to the relative amount of power applied to the float by the force of the waves and the force of gravitation either simultaneously over the entire float in either an upward or downward direction, or simultaneously in different directions on different parts of the float; and by using the varying speed and power of these motions, relatively as applied, to compress air or pump water into reservoirs, the said air or water would then be an equalized supply of potential energy, the total amount of which would be relatively equivalent to the sum of all the variable amounts transmitted at all times, and the said potential energy could be used to drive engines or motors at any desired speed or for any desired purpose—

The number of columns, floats, cables, sheaves, wheels, counterweights, pumps, compressors, or other parts may be duplicated or increased and various other changes made without changing the fundamental principles of the invention; as, for instance, sprocket-chain and wheels may be used in place of wire cables and drums, or storage batteries used in place of water reservoirs or air receivers. These parts, individually considered, are not claimed herein, and I do not wish to limit my present invention to the use of these specific devices, as others may be employed to perform the same, or substantially the same, functions in the several combinations herein claimed, which, in so far as they are equivalents of the elements of combination claimed, I include herein as within my invention.

Having thus described my invention, what I claim as new and desire to secure protection in by Letters Patent of the United States, is:—

1. In a wave-power motor, a pier, a plurality of converters or sets of converting mechanism each having a plurality of pumps or equivalents that may be used either singly or collectively so that power may be received by, converted, and transmitted from each of said converters relatively as applied in different amounts at different times, in combination with a float and a plurality of power-transmission cables, one for each converter, arranged to transmit the power of all motions of the float relatively as applied, to the different sets of power-converting mechanism, substantially as shown and described.

2. In a wave-power motor, a pier, a float between four of the columns of said pier the length and width of which is less than the distance in corresponding directions between said colums, anchorage cables of such a length as to permit the float to rock and move in all directions but to prevent it from touching the columns, eight adjustable converters or sets of converting mechanism, each adjustable to different amounts of power, and eight power-transmission cables, each cable being connected with a different part of the float from any other cable and to a different one of said converters, each one of said cables and its converter operating separately and independently of each of the other cables and converters, and each cable and its converter provided with a plurality of pumps or equivalents that can be used singly or collectively, thereby affording means for adjustment so as to receive, convert and transmit power relatively as applied to each in different amounts at different times, substantially as shown and described.

3. In a wave-power motor, a pier, a float, eight converters or sets of power-converting mechanism, eight power-transmission cables, one end of each of said cables connected with said float, the other end of each of said cables connected with one of said converters, each converter having a plurality of pumps or equivalents that may be used singly or collectively so that power may be received by, converted and transmitted from each of said converters in different amounts relatively as applied to each at different times by the variations in the force of the waves, or simultaneously by different converters in either similar or different directions, simultaneously or at different times in either equal or unequal amounts, relatively as applied by the waves to the float and transmitted from the float by means of each cable to the separate, independently operated converter with which it is connected.

4. In a wave-power motor, a float with a plurality of power transmitting cables so arranged that they will receive and transmit power simultaneously as follows: either one up and one down, or a plurality up and a plurality down, a separate and independent converting mechanism for and connected to each cable, each converting mechanism having means to receive, convert and transmit power in different amounts.

5. In a wave-power motor, the combination of spaced immovable anchor columns, counterbalanced, self-adjusting collars thereon, and anchor cables, the bight of which are loosely supported on said collars, with a float free to rock, tip or move in any direction within the space between the columns but secured to both ends of each of said anchor cables, a plurality of power-transmission cables attached to the float, a separate set of converting mechanism connected to each of said cables and adapted to receive, convert and transmit the power of all motions relatively as applied thereto through said cables.

6. In a wave-power motor, immovable anchor columns, an automatically adjusting float, anchorage cables having their bight counterbalanced, loosely supported around the columns, each end of said cables being attached to the float, so spaced apart as not to come in contact or interfere with the operation of the power-transmission cables between them, in combination with pumps and serving to transmit thereto the power of each and every motion of each and every part of the float relatively as applied.

7. In a wave-power motor, the combination of eight power-transmitting cables and eight converters or sets of power-converting mechanism, a converter for each cable, each cable and set of converting mechanism receiving transmitting and converting power relatively as applied to each separate and independent from each of the others, in combination with power storage means by which the varying amount of power from each and all of them is converted into an equalized supply of potential energy, the total amount of which will be relatively equivalent to the sum of that transmitted by each cable, substantially as set forth and described.

8. A wave-power motor comprising a float, eight power-transmitting cables, eight sets of power-converting mechanism connected thereby with the float and adapted to all variations in direction and extent of all motions of the float, no matter whether acting simultaneously in the same or different directions, in combination with a plurality of pumps or equivalent means as parts of each set of said power-converting mechanism, to receive, convert and transmit power in either equal or unequal amounts from all the motions of the float, whether simultaneously in the same or in different directions, and to convert and combine it in a common store of potential energy that is relatively equivalent to the sum of all the various amounts transmitted thereto at different times and in different directions.

9. In a wave-power motor, immovable columns, counterbalanced automatically adjusting collars thereon, a float, anchorage cables with their bight loosely supported by eyes and flanges around the collars and both ends of said cables attached to the float at different places, and means for transmitting and converting the power of all the irregular motions of the float, relatively as applied, into a common store of potential energy.

10. In a wave-power motor, a pier, a float, a plurality of separately operating converters or sets of power-converting mechanism, a plurality of power-transmitting cables, one for each converter, in combination with a plurality of pumps or equivalents as part of each set of power-converting mechanism, with means to connect or disconnect said pumps so that they may be used singly or collectively so as to obtain power relatively as applied by the waves to each converter in different amounts at different times.

11. In a wave-power motor, the combination of a pier, eight converters or sets of converting mechanism, means to permit the float to move in any direction but prevent it from coming in contact with the pier, a power transmitting cable connecting each converter with the float, each converter and its cable operating independently of each of the others, one or more pumps or equivalent for each converter, means by which any or all pumps may be disconnected from or operatively connected to their respective converters so that resistance may be offered to and power thus be obtained relatively to the different amounts of power applied to the float in different directions at different times by the force of gravity and the ever-varying force of the waves.

12. In a wave-power motor, means for utilizing power relatively as applied by the force of the waves and the force of gravity comprising means for receiving and transmitting power simultaneously in different directions and in different amounts, or in similar directions but in different amounts at different times, and of converting the different amounts transmitted at all times into a common store of potential energy that is relatively equivalent to the sum of the different amounts transmitted in all directions at all times, one or more storage reservoirs, a plurality of pumps with means for disconnecting them from or operatively connecting them to their driving mechanism so that they may be used either singly or in series or groups in varying capacities to correspond relatively with the variations in wave force, in combination with a float and means for transmitting the irregular motion and power of the waves from the float to the pumps, substantially as set forth and described.

13. In a wave-power motor, a pier with a plurality of spaced, immovable columns, a float free to move in any direction between said columns, a plurality of pumps, driving mechanism therefor and means for connecting or disconnecting them to or from said driving mechanism in such manner that they may be operated, singly or collectively, in equal or varying ratios to conform with the difference in wave force at different times and the differences that may occur simultaneously in different directions, and means for operatively transmitting the power of all motions of the float to the pump driving mechanism relatively as transmitted to the float by the waves and the force of gravity.

14. A wave-power motor having a float, a plurality of sets of converting mechanism, a plurality of power-transmitting cables, each connecting the float with a different set of converting mechanism, adapted to convert reciprocating motion of cables into rotary motion of wheels and shafts, in combination with a plurality of pumps, one for each set of converting mechanism, means for connecting or disconnecting any or all of said pumps and said converting mechanism so that power may be taken simultaneously in equal or in unequal amounts from some or all of the cables, or in different amounts from the same cables at different times, so as to conform relatively to the variations in wave motion and power.

15. In a wave-power motor, a float, eight sets of converting mechanism each having one or more pumps, four power-transmitting cables D connected to said float, one at or near each corner, each of said cables being connected to and operating, by the downward motions of the float, a set of converting mechanism, in combination with four power-transmitting cables D¹ connected to said float, one at or near each corner, each of said cables being connected to and operating, by the upward motions of said float, a set of converting mechanism, substantially as set forth.

16. In a wave-power motor, a pier with a plurality of spaced, immovable columns, a float free to move in any direction between said columns, anchorage-cables adapted so to limit the horizontal motions of the float as to prevent its striking the columns, collars on said columns having flanges adapted to hold said anchorage-cables between them, connections between outer edges of said flanges forming eyes through which said cables are passed to keep the cables in position and cause the up and down pull on the cables to keep the collars in alignment with columns on which they are mounted, counterweight cables having one end attached to said collars, sheaves over which said cables pass and counterweights on the cable ends to counterbalance said collars and part of the weight of anchorage-cables, in combination with storage means and associated converting mechanism, transmission cables connecting said float and mechanism, guiding sheaves, and counterweights for said cables.

17. In a wave-power motor, a pier, a plurality of anchorage columns forming part of said pier supports, a float between said columns the area of which is less than the space within the columns thereby permitting free motion of the float in all directions, loosely fitting, counterbalanced anchorage collars encircling said anchorage columns, flanges and eyes on said collars, a plurality of anchorage cables, both ends of each of which are fastened to the float and the bight of each loosely supported between and within the flanges and eyes of said collars, each cable of a proper length to allow the float to rock and move in all directions but not to touch the columns, counterweights operatively connected with the anchorage collars by means of cables suspended over sheaves, in combination with a plurality of power-transmission cables and sets of adjustable power-converting mechanism adapted to receive, convert and transmit wave power relatively as applied simultaneously in different directions in either equal or unequal amounts or in similar directions in either equal or unequal amounts or in different amounts at different times, substantially as shown and described.

In testimony whereof I have signed my name to this specification.

EDWARD D. STODDER.